(12) United States Patent
Bock (10) Patent No.: US 7,446,291 B1
(45) Date of Patent: Nov. 4, 2008

(54) AUGMENTED PROPORTIONAL NAVIGATION GUIDANCE LAW USING ANGULAR ACCELERATION MEASUREMENTS

(75) Inventor: Gregory F. Bock, Feasterville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 203 days.

(21) Appl. No.: 11/242,498

(22) Filed: Oct. 3, 2005

(51) Int. Cl.
*F41G 7/00* (2006.01)
*F42B 15/00* (2006.01)

(52) U.S. Cl. ............... 244/3.1; 244/3.11; 244/3.15; 89/1.11

(58) Field of Classification Search ........... 244/3.1–3.3; 89/1.11; 342/59, 61–68, 175, 195; 701/300–302
See application file for complete search history.

(56) References Cited

U.S. PATENT DOCUMENTS

| | | | | |
|---|---|---|---|---|
| 3,260,478 | A * | 7/1966 | Welti | 244/3.14 |
| 3,737,122 | A * | 6/1973 | Solov et al. | 244/3.21 |
| 4,405,985 | A * | 9/1983 | Hall et al. | 244/3.11 |
| 4,456,862 | A * | 6/1984 | Yueh | 244/3.14 |
| 4,492,352 | A * | 1/1985 | Yueh | 244/3.15 |
| 4,494,202 | A * | 1/1985 | Yueh | 701/302 |
| 4,502,650 | A * | 3/1985 | Yueh | 244/3.15 |
| 6,064,332 | A | 5/2000 | Cloutier | 342/62 |
| 6,244,536 | B1 | 6/2001 | Cloutier | 244/3.19 |
| H1980 | H * | 8/2001 | Cloutier | 342/62 |
| 6,302,354 | B1* | 10/2001 | Patera | 244/3.15 |
| 6,845,938 | B2 | 1/2005 | Muravez | 244/3.11 |

FOREIGN PATENT DOCUMENTS

WO    WO 02/48636 A1 *  6/2002

OTHER PUBLICATIONS

U.S. Statutory Invention Registration No. US H1980, published Aug. 7, 2001, filed Nov. 29, 1996, in the name of The United States of America as represented by the Secretary of the Air Force.

* cited by examiner

*Primary Examiner*—Bernarr E Gregory
(74) *Attorney, Agent, or Firm*—Duane Morris LLP (57) ABSTRACT

A method guides an interceptor missile toward an accelerating target. The method sets up a line-of-sight between the interceptor and the target, and monitors the acceleration of the angle of the line-of-sight. The acceleration is multiplied by a gain factor dependent upon the range between the target and the interceptor, to generate a driving acceleration. The acceleration of the interceptor in a direction perpendicular to the line-of-sight is added to the driving acceleration, to generate pre-weighted acceleration. The pre-weighted acceleration is multiplied by a navigation factor to produce commanded interceptor acceleration.

8 Claims, 5 Drawing Sheets

AUGMENTED PROPORTIONAL NAVIGATION GUIDANCE LAW USING ANGULAR ACCELERATION MEASUREMENTS

FIELD OF THE INVENTION

This invention relates to an interceptor or seeker control system which uses the acceleration of the rotation of the line-of-sight between the interceptor and the target, together with acceleration of the interceptor missile perpendicular to the line-of-sight, to control the interceptor acceleration.

BACKGROUND OF THE INVENTION

Interceptor guidance systems are currently of great interest, in particular when engaging accelerating targets. In general, prior-art guidance systems require that the target acceleration be estimated. If the target acceleration is incorrectly estimated, it is possible for the interceptor to be commanded to very high accelerations near the intercept point, and the target may be missed altogether if the interceptor commanded acceleration is greater than its capability.

U.S. Pat. No. 6,244,536, issued Jun. 12, 2001 in the name of Cloutier describes an air-to-air homing missile guidance algorithm based on a state-dependent Riccati equation solution of a spherical-based nonlinear intercept representation of the intercept kinematics problem. The algorithm also provides characteristics asymptotically stabilizing the intercept kinematics achieved with the classic proportional navigation or PRONAV intercept algorithm but provides reduced hunting instability and other fuel-consuming and time consuming missile maneuvers. The algorithm is in the form of four state equations, two equations for an angular acceleration embodiment and two for a linear acceleration embodiment. Each such embodiment includes seven state variables each having a gain coefficient of complex fraction form; each embodiment is additionally refined for differing cross-channel couplings. Each algorithm avoids need to estimate the time-to-go parameter and achieves indirect rather than faulted direct minimization of missile miss distance when provided with accurate target and missile acceleration data.

US Statutory Invention Registration H1980, issued Aug. 7, 2001 in the name of Cloutier describes an interceptor guidance system for intercepting accelerating targets in which it is assumed that the interceptor is slowing.

U.S. Pat. No. 6,845,938 issued Jan. 25, 2005 in the name of Muravez describes an interceptor guidance system in which small-angle approximations result in periodic inaccuracies which may result in guidance law destabilizations. The approximations are periodically corrected.

Improved and or alternative interceptor guidance control systems are desired.

SUMMARY OF THE INVENTION

A method for guiding an interceptor toward an accelerating target according to an aspect of the invention includes the steps of setting up a line-of-sight between an interceptor and the target, and monitoring the acceleration of the angle of the line-of-sight. The acceleration of the angle is multiplied by a gain factor dependent upon the range between the target and the interceptor, to thereby generate an interceptor driving acceleration. The interceptor driving acceleration is added to the acceleration of the interceptor perpendicular to the line-of-sight, to thereby generate pre-weighted acceleration. The pre-weighted acceleration is multiplied by a navigation factor to produce commanded interceptor acceleration. In a particular mode of the method, the step of setting up a line-of-sight between an interceptor and said target comprises the step of determining the angle formed between first and second reference lines, where the first reference line extends from the interceptor to a point in a static reference frame, and the second reference line extends from the interceptor to the target.

BRIEF DESCRIPTION OF THE DRAWING

FIG. 2b is a simplified plot of line-of-sight rate (losr) and line-of-sight acceleration (losa) as a function of time for the engagement of FIG. 2a;

DESCRIPTION OF THE INVENTION

Figure 1:
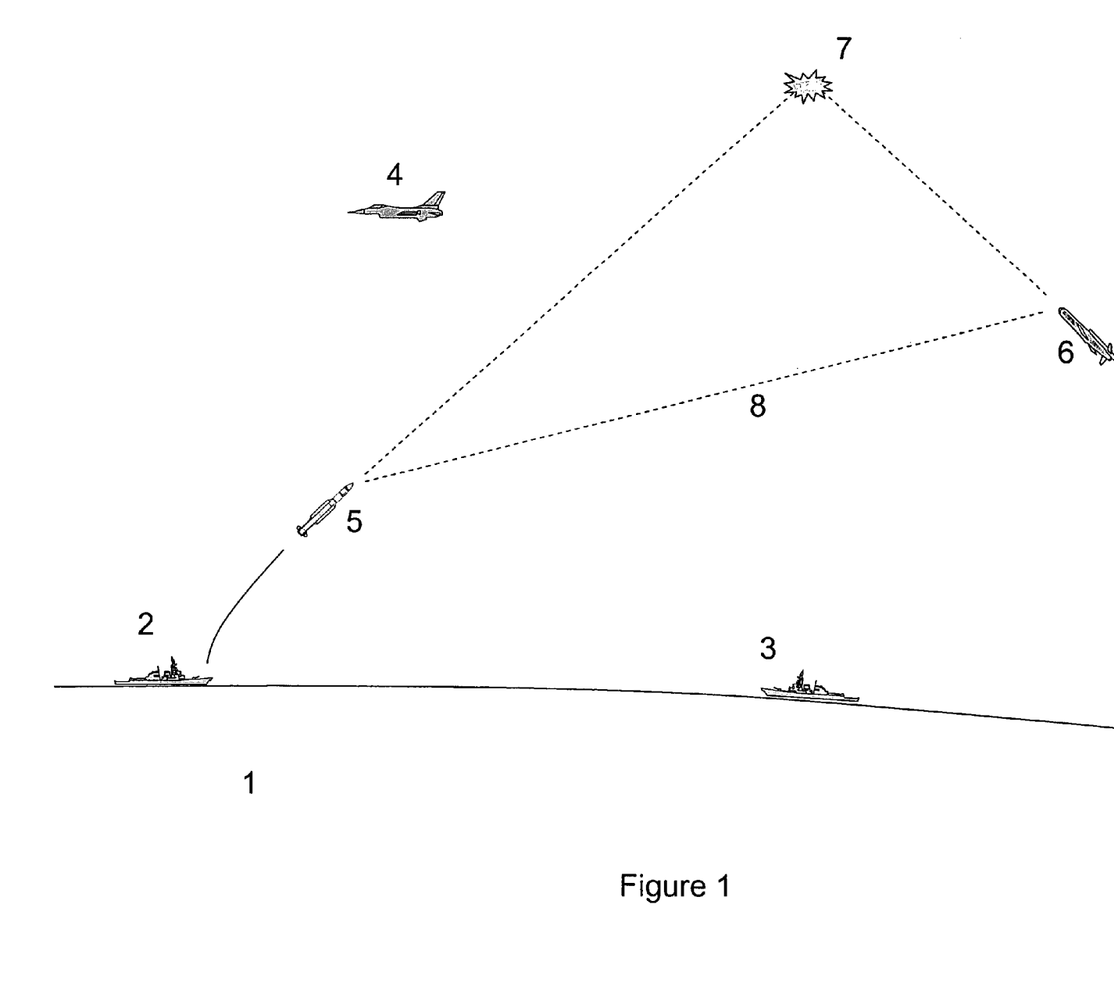
FIG. 1 is a simplified diagram illustrating one possible scenario in which an interceptor missile is directed toward a target missile.

FIG. 1 is a simplified diagram illustrating a possible scenario in which interceptor missile guidance according to an aspect of the invention may be used. In FIG. 1, a warship 2 floats on an ocean 1. A hostile missile 6 is launched from a location (not) illustrated. The hostile missile 6 is observed by a ship 3 and by an aircraft 4, which report information relating to the missile 6 to ship 2. Ship 2 launches an anti-missile interceptor 5. A line-of-sight 8 extends between interceptor missile 5 and target missile 6. Control of the antimissile interceptor 5 is based on tracking information which may be derived from sensors, such as radar, lidar, infrared, or optical which are mounted aboard ship 2, aircraft 4, additional ship 3, and/or antimissile interceptor 5.

The governing theory of prior-art proportional navigation for control of interceptor 5 of FIG. 1 is to the effect that that maintaining a constant line-of-sight (line-of-sight rotation rate of zero) will result in an intercept. The intercept is achieved by applying acceleration commands ($N_C$) for causing the interceptor 5 to accelerate perpendicular to the line-of-sight 8 extending between the interceptor missile 5 and the target missile 6. The magnitude of the commands is proportional to the line-of-sight rotation rate (losr) as follows:

$$N_C = -K \cdot V_C \cdot \dot{\lambda} \qquad (1)$$

where:

K is the navigation gain constant;

$V_C$ is the closing rate of the target and missile;

$\lambda$ is the line-of-sight extending between the target and the missile; and $\dot{\lambda}$ is the line-of-sight rotation rate.

The condition for intercept (assuming no target acceleration) is found to be $R_{tm}\dot{\lambda}=0$, where $R_{tm}$ is the range from the target to the missile. The term $R_{tm}\dot{\lambda}$ represents the relative velocity perpendicular to the line-of-sight. If this term is zero, it is indicative of a situation such that the relative velocity is parallel to the vector ($R_{tm}$) from the missile to the target. It should be noted that line-of-sight rotation rate is often termed simply "line-of-sight rate."

Zero effort miss (ZEM) is a term used to describe the miss distance of the interceptor if the interceptor coasts for the remaining time of flight. If $R_{tm}\dot{\lambda}\neq 0$, the zero effort miss at any time to go can be calculated as follows:

$$ZEM = R_{tm} \dot{\lambda} \cdot Tgo \quad (2)$$

where

Tgo is the time remaining until intercept.

Figure 2A:
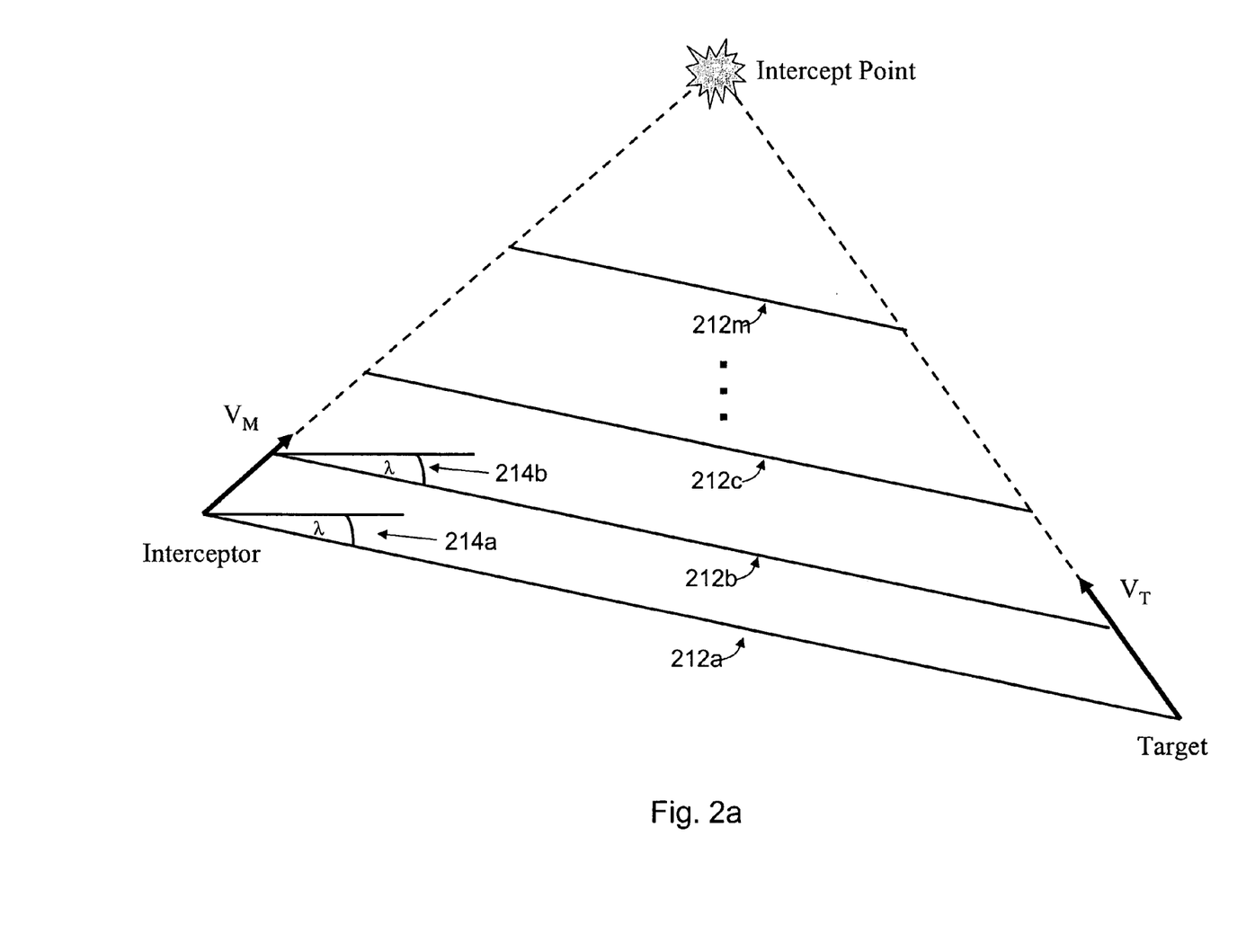
FIG. 2a is a simplified plot of the geometry of a ZEM=0 engagement intercept for a prior-art Proportional Navigation.
Figure 2B:
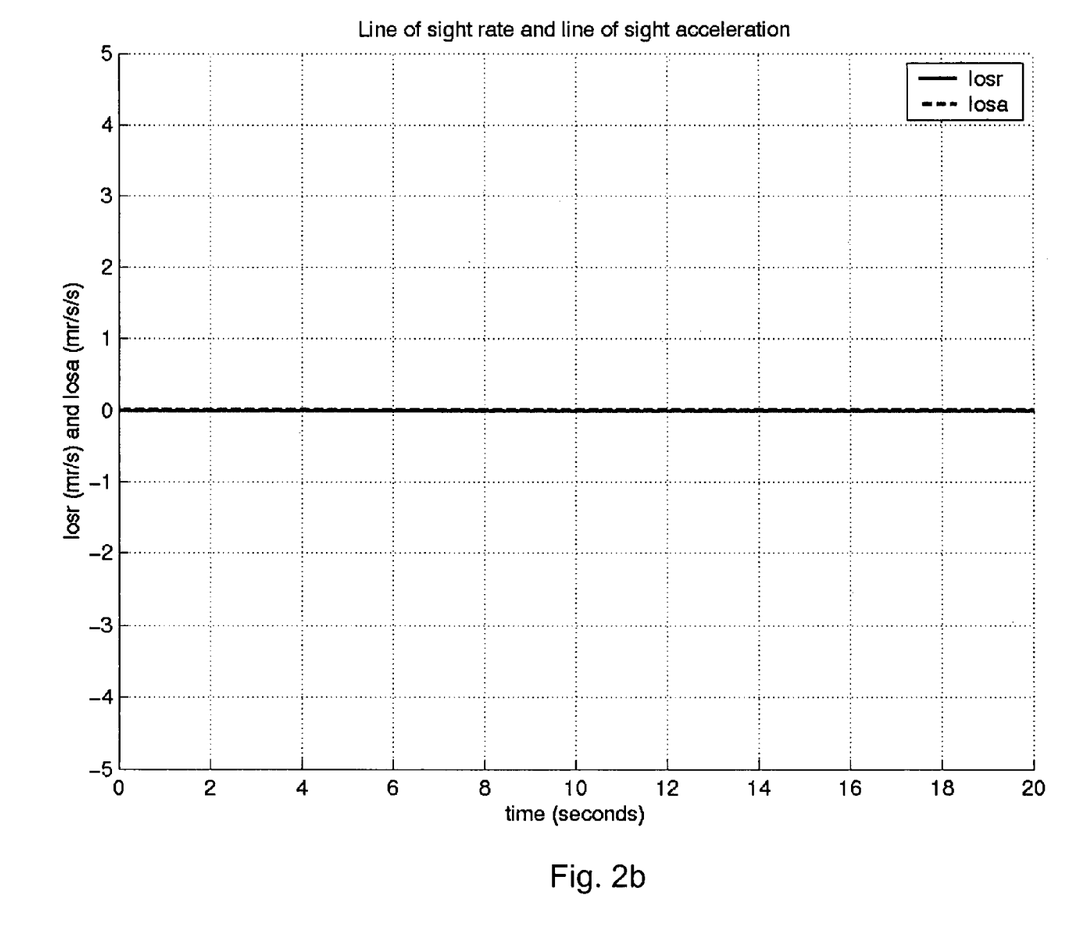

As one can see from equation (2), the principle of forcing the line-of-sight rotation rate to zero is based upon creating an intercept geometry where the zero effort miss is zero. This concept is illustrated in FIG. 2a. In FIG. 2a, the velocity of the target is designated $V_T$ and the velocity of the interceptor is designated $V_M$. Lines 212a, 212b, 212c, ..., 212n of set 212 represent the Range vector from the missile to the target at various times, and lines 214a, 214b, ... of set 214 are the line-of-sight symbolized by $\lambda$ referenced to a static reference frame represented by 215a, 215b, ... of set 215. The line-of-sight is thus an angle. As can be seen, the angle $\lambda$ remains constant throughout the interception. As a result, both the line-of-sight rotation rate and line-of-sight rotation acceleration are equal to zero, as shown in the plots of FIG. 2b. FIG. 2b plots an example of the line-of-sight (rotation) rate (losr) and line-of-sight (rotation) acceleration (losa) against time for an engagement in which the interceptor and the target are on a collision course. It is important to note that neither the missile nor the target accelerate in any direction during the course of their respective flights in the scenario of FIGS. 1a and 1b. Unfortunately, this prior-art criterion for intercept is not valid during an engagement in which the target is accelerating. Equation (2) must therefore be modified to account for the target's acceleration perpendicular to the line-of-sight. It should be noted that the line-of-sight rotation acceleration is often referred to simply as "line-of-sight acceleration."

For an engagement in which the target is not accelerating, the heading error HE can be calculated by a standard method. That is, it is represented visually by the angular difference between the range target-to-missile vector and the velocity target-to-missile vector. This equation can be written as $$HE = \cos^{-1}\left(\frac{\vec{R}_{tm}\cdot\vec{V}_{tm}}{|\vec{R}_{tm}||\vec{V}_{tm}|}\right) \text{ radians} \quad (3)[2.1]$$

where:

$R_{tm}$ is the difference of the target and interceptor missile position vectors; and $V_{tm}$ is the difference of the target and interceptor missile velocity vectors.

In the case where the target is accelerating, the definition of the heading error of equation (3) cannot be considered accurate. For purposes of the description herein, the heading error HE when engaging an accelerating target is defined as the angular error between the interceptor's velocity vector $V_M$ and the line-of-sight to the true intercept point (a ZEM=0 heading error). This definition results in an additional term in the heading error calculation to account for the future target acceleration.

Figure 3:
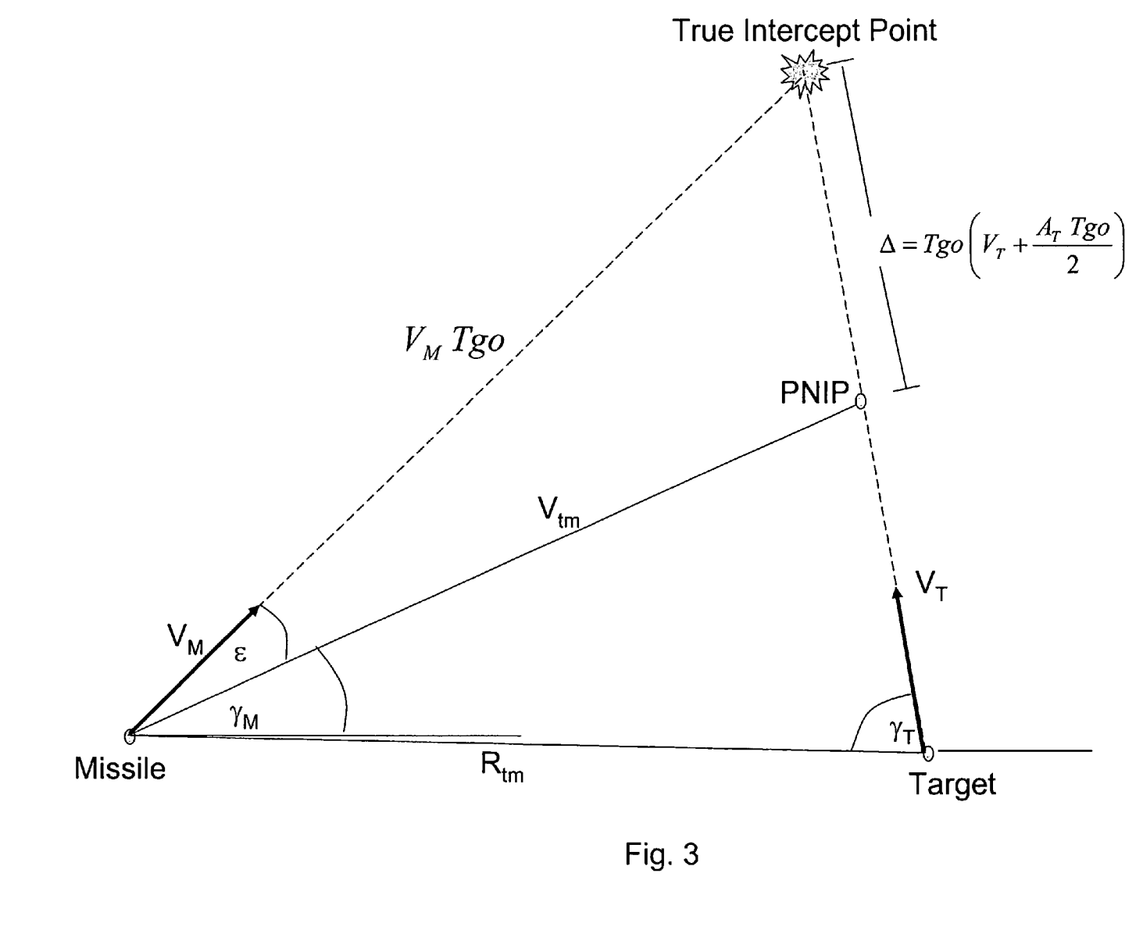
FIG. 3 plots the intercept geometry for an accelerating target.

The intercept geometry for the scenario of an accelerating target is illustrated in FIG. 3. In FIG. 3, the difference between the interceptor missile and target position vectors is designated $R_{tm}$, $V_M$ is the interceptor velocity, $V_T$ is the target missile velocity, $V_M Tgo$ is the interceptor velocity multiplied by the time to intercept, $V_{tm}$ is the target velocity vector minus the interceptor velocity vector, PNIP represents the intercept point as predicted by proportional navigation, $\Delta$ is the intercept point error introduced by proportional navigation guidance by failing to account for target acceleration, $\gamma_T$ is the flight path angle of the target, and $\gamma_M$ is the flight path angle of the interceptor. The heading error HE for an accelerating target engagement can be defined as $$HE = \cos^{-1}\left(\frac{\vec{R}_{tm}\cdot\vec{V}_{tm}}{|\vec{R}_{tm}||\vec{V}_{tm}|}\right) + \sin^{-1}\left(\frac{\Delta}{V_M Tgo}\sin(\gamma_T)\right) \text{ radians} \quad (4)$$

The time-to-go Tgo can be calculated when engaging an accelerating target, provided heading error is neglected. The time-to-go equation is $$Tgo = \frac{-\dot{R}_{tm} - \sqrt{\dot{R}_{tm}^2 - 2(\ddot{R}_{tm})R_{tm}}}{\ddot{R}_{tm}} = \quad (5)[2.3]$$

$$\frac{-\dot{R}_{tm} - \sqrt{\dot{R}_{tm}^2 - 2(A_{ll}+R_{tm}\dot{\lambda}^2)R_{tm}}}{A_{ll}+R_{tm}\dot{\lambda}^2}$$

where $A_{ll}$ is the net acceleration of the interceptor and the target along the line-of-sight.

It is important to note that as the denominator in equation (5) approaches zero (often due to a condition representative of a ZEM intercept) the conventional time-to-go equation $$Tgo = \frac{\vec{R}_{tm}\cdot\vec{R}_{tm}}{\vec{R}_{tm}\cdot\vec{V}_{tm}} \quad (6)$$

should be used to avoid a singularity. Use of the conventional definition of Tgo in the presence of an accelerating target introduces a commanded acceleration error that is not present when using equation (5).

Classic proportional navigation assumes that Tgo linearly decreases as a function of time because of the assumptions (no target acceleration or large heading errors) made about the engagement. Neither of these assumptions is valid when engaging an accelerating target. As a direct result, the range rate is no longer constant and Tgo is no longer linear with respect to time. It can be assumed that the effects of the target acceleration in a direction perpendicular to the line-of-sight ($A_{\perp T}$) are known, with the result that the modified form of the zero-energy-miss (ZEM) equation is $$ZEM = R\dot{\lambda}\cdot Tgo + \frac{1}{2}A_{\perp T}\cdot Tgo^2 \quad (7)$$

Using the same method as in proportional navigation, we can find a condition for intercept by setting ZEM equal to zero and solving for line-of-sight rotation rate $\dot{\lambda}$ $$\dot{\lambda}_S = -\frac{A_{\perp T} \cdot Tgo}{2R} \quad (8)$$

The subscript "s" in equation (8) refers to the fact that there is a specific or unique (one and only one) line-of-sight rotation rate that will result in an intercept. If complete knowledge of the target and missile states is known, Tgo can be computed considering the effects of the net acceleration (as in equation 5) resulting in a theoretically correct expression for $\dot{\lambda}_S$.

Often, Tgo is assumed to be linear due to the limited knowledge of certain target states (specifically the target acceleration). Therefore the assumption is made that the target is not accelerating and that the closing rate $V_C$ can be approximately defined as follows $$V_C = -\dot{R} = \frac{R}{Tgo} \quad (9)$$

The effects of this approximation on the guidance are described below.

Substituting equation (9) into equation (8) yields the line-of-sight rotation rate condition for intercept.

$$\dot{\lambda}_S = -\frac{A_{\perp T}}{2V_C} \quad (10)$$

A target acceleration of zero in equation (10) results in the classic proportional navigation criteria for intercept, which states that the line-of-sight rotation rate must equal zero.

Figure 4:
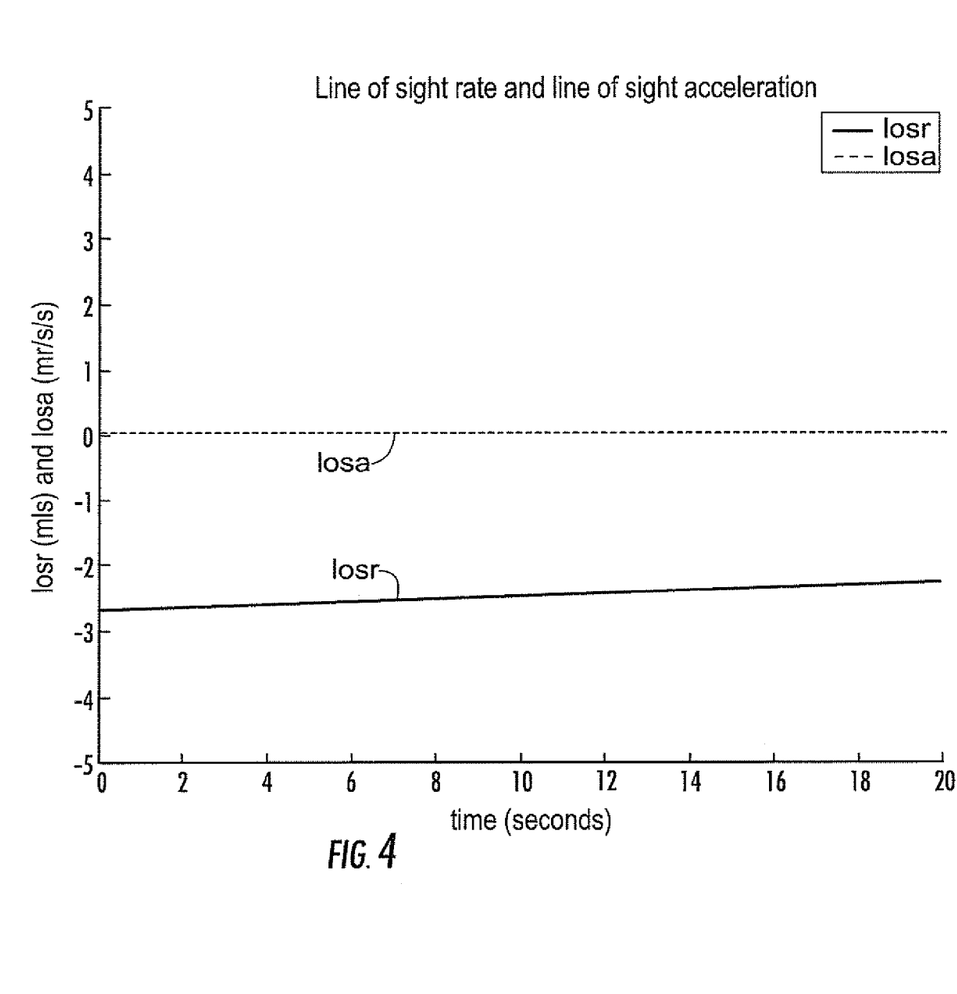
FIG. 4 plots the line-of-sight rotation rate and line-of-sight rotation acceleration for a ZEM=0 engagement when the target is accelerating.

An engagement involving an accelerating target will have a specific non-zero line-of-sight rotation rate $\dot{\lambda}_S$ for the length of the engagement. FIG. 4 plots as a function of time the result of a simulated engagement in which the initial position of the interceptor was selected so that the intercept would occur without giving any guidance commands to the interceptor (ZEM=0). In FIG. 4, the solid line represents the line-of-sight rotation rate (losr) and the dash line represents the line-of-sight rotation acceleration (losa). It becomes clear in the ZEM=0 engagement of FIG. 4 that the line-of-sight rotation rate is unique in that it is countering the line-of-sight rotation rate induced by the target acceleration. If there were no interceptor acceleration, the line-of-sight rotation acceleration (losr) would be forced to be zero in order to achieve intercept. The line-of-sight rotation rate in FIG. 4 is obviously not constant. However, the rate of change of the line-of-sight rate (that is, the line-of-sight rotation acceleration) is small enough that we will still consider the line-of-sight rate a valid approximation, keeping in mind that there may be effects on performance.

According to an aspect of the invention, the condition for intercept is a line-of-sight rotation rate requirement. This allows us to use a modified form of the traditional proportional navigation equation for the guidance law, with interceptor accelerations being applied perpendicular to the line-of-sight. The modified form of proportional navigation biases the line-of-sight rotation rate by the specific line-of-sight rotation rate. The acceleration N of the interceptor is $$N = -K \cdot V_C \cdot (\dot{\lambda} - \dot{\lambda}_S) \quad (11)$$

where $V_C$ is the closing rate, as mentioned above, or, in vector form, $$N = -K \cdot V_C \cdot (\hat{R} \times (\vec{\dot{\lambda}} - \vec{\dot{\lambda}}_S)) \quad (12)$$

In order to make use of the law expressed by equations (11) or (12), one must supply the unique or specific line-of-sight rate, preferably accurately. If access to target acceleration is available so that equations 5 and 8 can be used (as expressions for Tgo and $\dot{\lambda}_S$ respectively), equations 11 and 12 would be the ideal guidance law for intercepting accelerating targets. Knowledge of the target's acceleration is not often available real-time. Therefore modifications are made to equations 11 and 12 so that real-time knowledge of the target acceleration vector is not needed.

From a basic understanding of the definition of line-of-sight rotation rate, we can take the derivative of equation (12) and find the line-of-sight rotation acceleration:

$$\ddot{\lambda} = \frac{\vec{R} \times \vec{A}}{|R|^2} + 2\dot{\lambda} \cdot \frac{V_C}{|R|} = \frac{A_{\perp T} - A_{\perp M}}{|R|} + 2\dot{\lambda} \cdot \frac{V_C}{|R|} \quad (13)$$

where:

$\vec{A}$ is the relative acceleration between target and interceptor.

Equation (11) can be expanded by substituting the definition of the specific line-of-sight rate found in equation (10). This form of the equation is identical to traditional augmented proportional navigation for the case when the interceptor can only accelerate perpendicular to the line-of-sight. The expanded form of equation (11) defines the interceptor acceleration as $$N = -K \cdot V_C \dot{\lambda} + \frac{K \cdot A_{\perp T}}{2} \quad (14)$$

where:

K is a navigation gain constant;

$V_C$ is the closing rate of the target and missile;

$\dot{\lambda}$ is the line-of-sight rotation rate; and $A_{\perp T}$ is target acceleration in a direction perpendicular to the line-of-sight.

By rearranging equation (13) in order to solve for the driving acceleration (line-of-sight rotation acceleration term that is a function of target acceleration), and substituting the results into equation (2.11), we get a more useful form of the interceptor guidance acceleration N $$N = -\frac{K}{2}(|R| \cdot \ddot{\lambda} + A_{\perp M}) \quad (15)$$

where:

K is the navigation gain constant;

|R| R is the absolute value of the range from the target to the missile;

$\ddot{\lambda}$ is the line-of-sight rotation acceleration; and $A_{\perp M}$ is the acceleration of the interceptor missile perpendicular to the line-of-sight.

Equation (15) is the final form of the guidance law for the interceptor missile according to an aspect of the invention.

Note how the guidance law interceptor missile commanded acceleration N depends on its knowledge of its own acceleration $A_{LM}$, as well as the line-of-sight acceleration ($\ddot{\lambda}$) to compensate for the target's acceleration. This control scheme may be termed True Augmented Proportional Navigation (TAPN).

An accurate sensor can be used to extract line-of-sight acceleration in the same manner that it calculates line-of-sight rate. As with other proportional navigation schemes, the interceptor acceleration N is applied perpendicular to the line-of-sight. According to an aspect of the invention, the interceptor guidance does not rely upon knowledge of the target's acceleration in order to compensate for the target's acceleration.

The results of any interceptor missile guidance system are the same in that ideally the interceptor impacts the target missile. However, the way the guidance system operates to achieve the result may differ. It is important to note that while the results of use of a seeker or guidance according to the invention may be the same for APN and TAPN guidance, the parameters required to drive the guidance laws are different. APN relies on line-of-sight rate and target acceleration, while TAPN relies on line-of-sight acceleration and interceptor acceleration.

In general, the invention relates to a method for guiding an interceptor missile (5) toward an accelerating target (6). The method sets up a line-of-sight ($\lambda$) between the interceptor (5) and the target (6), and monitors the acceleration ($\ddot{\lambda}$) of the angle of the line-of-sight. The acceleration ($\ddot{\lambda}$) is multiplied by a gain factor ($|R|$) dependent upon the range ($R_{tm}$) between the target (6) and the interceptor (5), to generate a driving acceleration ($|R|\ddot{\lambda}$). The acceleration of the interceptor in a direction perpendicular to the line-of-sight ($A_{LM}$) is added to the driving acceleration ($|R|\ddot{\lambda}$), to generate pre-weighted acceleration ($|R|\ddot{\lambda}+A_{LM}$). The pre-weighted acceleration ($|R|\ddot{\lambda}+A_{LM}$) is multiplied by a navigation factor (K/2) to produce commanded interceptor acceleration ($N_C$) of the interceptor (5).

A method for guiding an interceptor (5) toward an accelerating target (6) according to an aspect of the invention includes the steps of setting up a line-of-sight ($\lambda$) between an interceptor (5) and the target (6), and monitoring the acceleration ($\ddot{\lambda}$) of the angle of the line-of-sight ($\lambda$). The acceleration of the angle ($\ddot{\lambda}$) of the line-of-sight is multiplied by a gain factor ($|R|$) dependent upon the range ($R_{tm}$) between the target (6) and the interceptor (5), to thereby generate an interceptor (5) driving acceleration ($|R|\ddot{\lambda}$). The interceptor (5) driving acceleration ($|R|\ddot{\lambda}$) is added to the acceleration of the interceptor (5) perpendicular to the line-of-sight ($A_{LM}$), to thereby generate pre-weighted acceleration ($|R|\ddot{\lambda}+A_{LM}$). The pre-weighted acceleration is multiplied by a navigation factor (K/2) to produce commanded interceptor (5) acceleration ($N_C$).

What is claimed is:

1. A method for guiding an interceptor toward an accelerating target, said method comprising the steps of:

setting up a line-of-sight between an interceptor and said target;

monitoring the acceleration of the angle of said line-of-sight;

multiplying the acceleration of said angle by a gain factor dependent upon the range between said target and the interceptor, to thereby generate a driving acceleration;

adding said acceleration of the interceptor perpendicular to the line-of-sight to said driving acceleration to thereby generate pre-weighted acceleration;

multiplying said pre-weighted acceleration by a navigation factor to produce a commanded interceptor acceleration; and commanding the interceptor to accelerate according to said commanded interceptor acceleration whereby the interceptor intercepts the target.

2. A method according to claim 1, wherein said step of setting up a line-of-sight between an interceptor and said target comprises the step of:

determining the angle formed between first and second reference lines, where said first reference line extends from said interceptor to a point within a static reference frame, and said second reference line extends from said interceptor to said target.

3. A method according to claim 2, wherein said step of monitoring the acceleration of the angle of said line-of-sight comprises the step of:

monitoring the rate of change with respect to time of said angle between said first and second reference lines;

monitoring the rate of change with respect to time of said rate of change with respect to time of said angle between said first and second reference lines.

4. A method according to claim 1, wherein said step of multiplying the acceleration of said angle by a gain factor dependent upon the range between said target and the interceptor, to thereby generate a driving acceleration, comprises the steps of:

multiplying said acceleration of said angle by gain factor dependent upon the range from the interceptor to the target.

5. A method according to claim 4, wherein said gain factor equals said range from interceptor to the target.

6. A method according to claim 1, further comprising the step of:

monitoring the rate of change of said line-of-sight; and wherein said step of adding said acceleration of the interceptor perpendicular to the line-of-sight to said driving acceleration to thereby generate pre-weighted acceleration comprises the steps of:

adding said driving acceleration to an estimate of the missile acceleration at the time said line-of-sight, said rate of change of said angle of said line-of-sight, and said acceleration of the angle of said line-of-sight are determined.

7. A method for guiding an interceptor toward an accelerating target, said method comprising the steps of:

monitoring the acceleration of the angle of a line-of-sight extending between an interceptor and said target;

multiplying said acceleration of said angle by a gain factor dependent upon the range between said target and the interceptor, to thereby generate a driving acceleration;

adding said acceleration of the interceptor perpendicular to said line-of-sight to said driving acceleration to thereby generate pre-weighted acceleration;

multiplying said pre-weighted acceleration by a navigation factor to produce a commanded interceptor acceleration; and commanding the interceptor to accelerate according to said commanded interceptor acceleration whereby the interceptor intercepts the target.

8. A method according to claim 7, wherein said step of monitoring the acceleration of the angle of a line-of-sight extending between an interceptor and said target comprises the step of monitoring the acceleration of a line-of-sight extending between said interceptor and said target relative to a line-of-sight extending from said interceptor and a point in a fixed reference frame.

* * * * *